United States Patent [19]

Mecklenburg

[11] 3,844,382
[45] Oct. 29, 1974

[54] MAST MOUNTED OVERHEAD GUARD

[75] Inventor: Clifford G. Mecklenburg, Homewood, Ill.

[73] Assignee: Allis-Chalmers Corporation, Milwaukee, Wis.

[22] Filed: Mar. 23, 1973

[21] Appl. No.: 344,255

[52] U.S. Cl.............. 187/9, 214/674, 214/DIG. 7, 280/150 C
[51] Int. Cl............................................. B66f 9/10
[58] Field of Search............. 214/DIG. 7, 672, 730; 187/1 R, 9; 280/150 C; 296/28 C, 102, 107, 137 R

[56] References Cited
UNITED STATES PATENTS

| | | | |
|---|---|---|---|
| 2,795,458 | 6/1957 | Wieschel | 296/102 |
| 2,975,923 | 3/1961 | Ulinski | 214/730 |
| 3,536,353 | 10/1970 | Goodacre | 280/150 C |

FOREIGN PATENTS OR APPLICATIONS

| | | | |
|---|---|---|---|
| 382,066 | 11/1964 | Switzerland | 280/150 C |
| 908,829 | 4/1954 | Germany | 296/102 |

*Primary Examiner*—Robert J. Spar
*Assistant Examiner*—Lawrence J. Oresky
*Attorney, Agent, or Firm*—Charles L. Schwab

[57] ABSTRACT

An electric lift truck with a mast, an operator's station and a battery compartment located intermediate the mast and the operator station is provided with an overhead guard pivotally mounted to the upper end of the mast. The overhead guard includes a pair of arms pivotally secured on a transverse axis to the mast permitting pivotal movement of the overhead guard to an upright position wherein the guard is vertically aligned with the mast and is out of the way of the battery when the battery is lifted from the battery compartment by an overhead crane or the like. The transverse spacing of the arms may be adjusted so that the overhead guard can be attached to masts of different widths. This is achieved by releasable fastening members interconnecting the arms and the grill of the guard. Additionally the grill is shiftable longitudinally of the arms so as to extend farther to the rear of a truck. A pair of reinforcing plates are welded to the top of the arms in a manner keeping the grill in loose assembly with the arms thus preventing disassociation of the parts when stored or shipped as a replacement unit. A pair of spaced abutments are provided on the mast for each arm whereby any substantial vertical loading of the overhead guard will be carried by the abutments rather than by the pivot member of the pivotal connection between the overhead guard and the mast.

8 Claims, 7 Drawing Figures

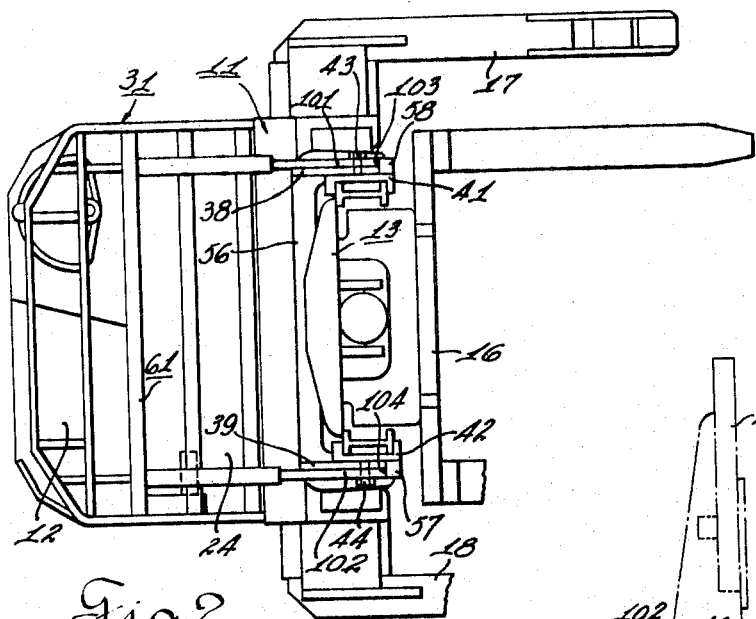
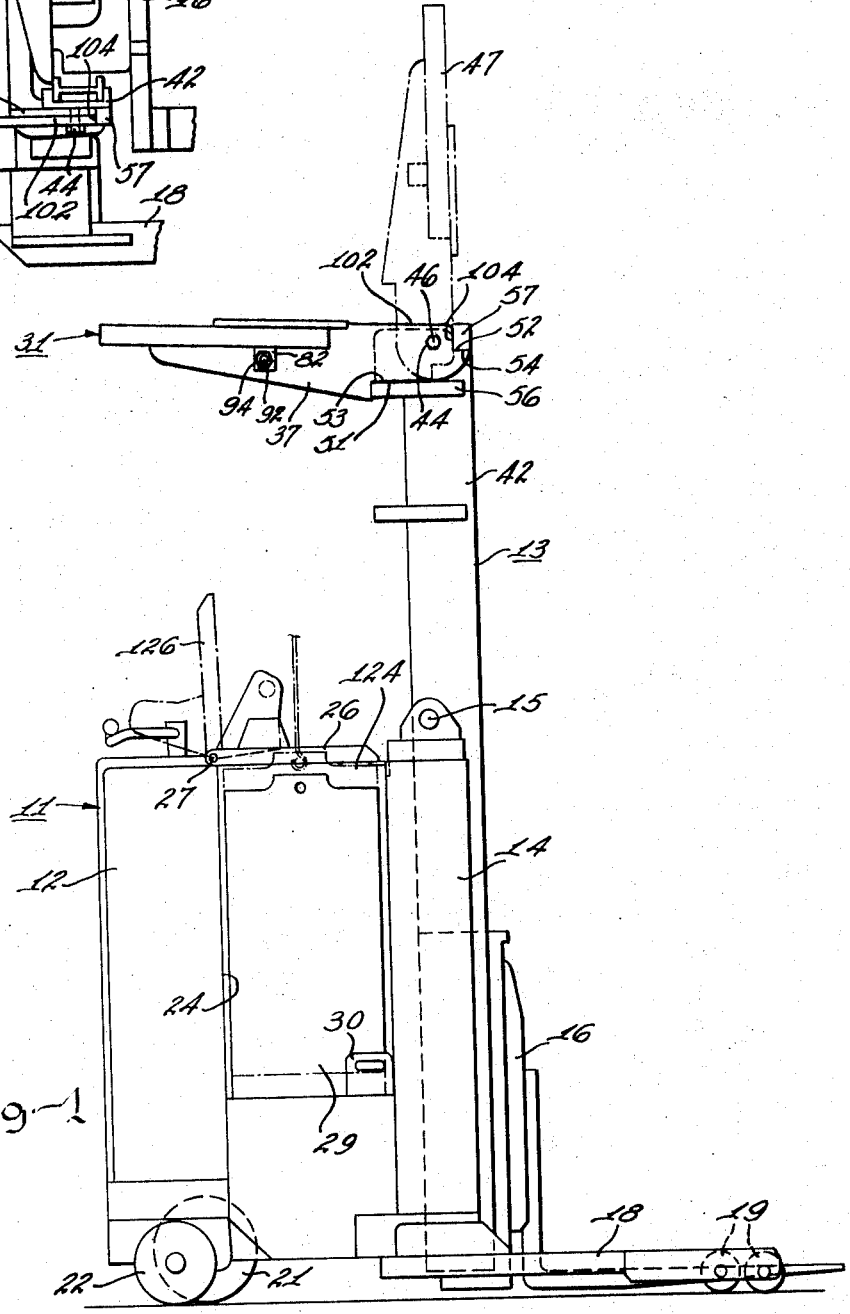

MAST MOUNTED OVERHEAD GUARD

BACKGROUND OF THE INVENTION

Heretofore, many different overhead guards have been provided or suggested for lift trucks. Overhead guards of interest are shown in U.S. Pat. Nos. 3,638,758; 3,563,401; 3,610,359; 2,806,618; 2,754,019 and 2,263,981.

BRIEF DESCRIPTION OF THE INVENTION

The present invention provides an overhead guard for an electric lift truck of the type having a mast at the forward end, an operator's station at the rear end and a top opening battery compartment between the operator's station and the mast. The overhead guard has a pair of arms which are pivotally connected to the top end of the mast on a transverse pivot axis to permit the overhead guard to move from a horizontal position to a vertical position. In the vertical position of the guard the battery may be removed by an overhead lift such as an overhead crane. The arms of the overhead guard are adjustably connected to the grill permitting the arms to be spaced at different lateral widths so as to be connectable to masts of different widths. Also the grill may be releasably secured to the arms at different longitudinal positions. This adjustability between the arms and the grill permits the overhead guard to be used on different models of lift trucks. The arms, in addition to being pivotally mounted on the mast, also have abutments which cooperate with complementary abutments on the top end of the mast in a manner whereby any substantial downward loading of the overhead guard is carried by the abutments rather than the pivot connection between the guard and the mast.

DETAILED DESCRIPTION OF THE INVENTION

The invention is illustrated in a narrow aisle straddle truck in the drawings in which:

FIG. 1 is a side view of an electric straddle type lift truck;

FIG. 2 is a top view of the truck shown in FIG. 1;

Figure 3:
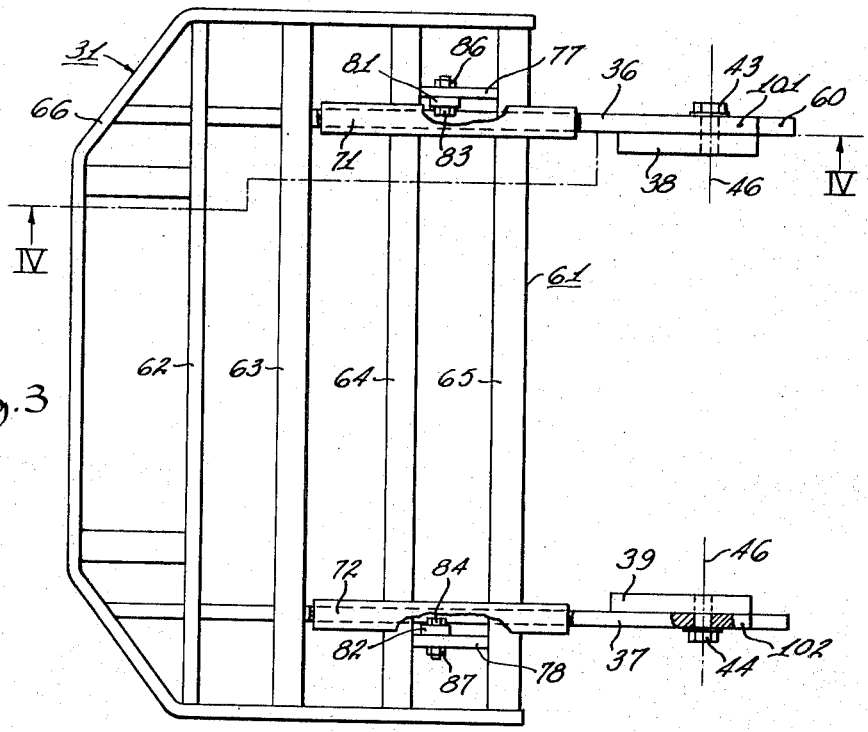
FIG. 3 is a top view of the overhead guard for the lift truck.

Referring to FIGS. 1 and 2, a narrow aisle straddle lift truck 11 includes an operator's station 12 at the rear end thereof and a mast 13 at the forward end thereof which is pivotally connected to the main frame 14 on a transverse pivot axis 15 and carries a load carriage 16. The lift truck 11 is supported at its front end by support wheels 19 on forwardly extending legs 17, 18 and at its rear end by a steerable drive wheel 21 and a castered support wheel 22. A battery compartment 24 is provided intermediate the mast 13 and the operator's station 12. The battery compartment 24 is covered by a battery cover 26 which is pivotable rearwardly about a transverse pivot axis 27 to a position shown in dot-dash lines 126. An electric battery 29 for powering the truck is disposed within the battery compartment 24 and kept in place by a pair of battery retainers 30, only one of which is shown.

Figure 4:
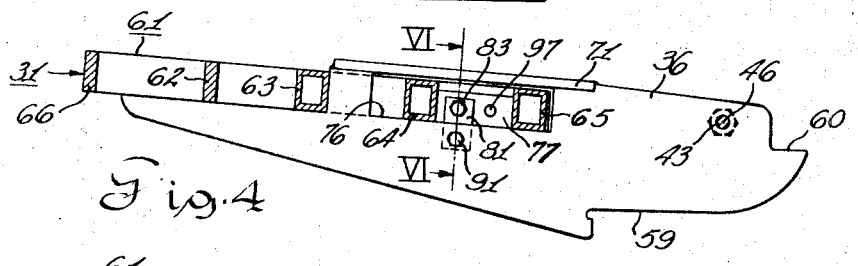
FIG. 4 is a section view taken along the line IV—IV in FIG. 3.
Figure 5:
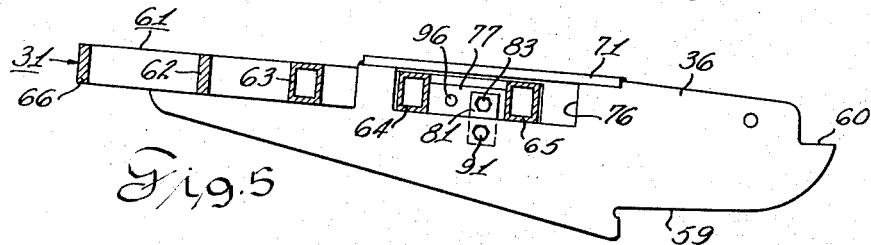
FIG. 5 is a view similar to FIG. 4 but showing the grill in a rearward position of longitudinal adjustment.

In order to provide protection for the operator during overhead depositing and retrieval operations, an overhead guard 31 is provided which in its illustrated full line horizontal position is shown in a protective relation to the operator's station 12. Referring also to FIG. 3, the overhead guard 31 includes a pair of longitudinally extending and transversely spaced parallel arms 36, 37 having their forward ends pivotally connected on a transverse axis 46 to plates 38, 39 secured as by welding to the nonextensible uprights 41, 42 of the mast 13. The pivotal connection between the cantilever arms 36, 37 and the plates includes pivot members in the form of a pair of cap screws 43, 44. The overhead guard 31 may be pivoted from its normal horizontally disposed position about its pivot axis 46 to the upright position as shown in phantom by dot-dash lines 47 wherein the guard 31 is virtually an upright extension of the mast 13. As shown in FIG. 1, the support arm 37 includes a pair of abutments 51, 52 which are in abutting engagement with complimentary abutments 53, 54 formed on a transverse brace 56 and laterally extending lug 57 of the mast 13. The transverse brace 56 is welded to the uprights 41, 42. As shown in FIGS. 4 and 5, abutments 59, 60 formed on arm 36 are adapted to engage abutments in the form of the brace 56 and a laterally extending lug 58. The abutments are so arranged that any substantial vertical loading of the guard 31 is resisted by the abutments rather than by the cap screws 43, 44. Thus, relatively small and inexpensive cap screws may be utilized to pivotally mount the overhead guard to the upper end of the lift truck mast.

A grill 61 for the overhead guard includes a plurality of parallel transverse bars 62, 63, 64, 65 having their opposite ends secured as by welding to a U-shaped wrap around member 66. The grill 61 is maintained in loose assembly with the arms 36, 37 by a pair of reinforcing plates 71, 72 welded to the top sides of the arms 36, 37. It will be noted, as shown in FIGS. 3 and 4, that the transverse bars 64, 65 pass through a transversely opening and longitudinally elongated window in arm 36 formed by the plate 71 and a cutout portion 76. As shown in FIGS. 4 and 5, the grill 61 may be positioned in either of two longitudinally spaced positions relative to the arm 36. This is achieved through an adjustable connection between the arms 36, 37 and the grill as will hereinafter be discussed.

Figure 6:
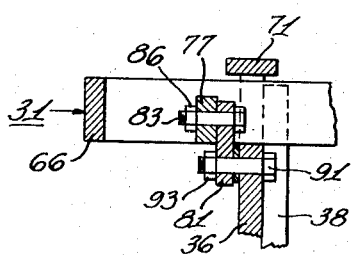
FIG. 6 is a section view taken along the line VI—VI in FIG. 4.
Figure 7:
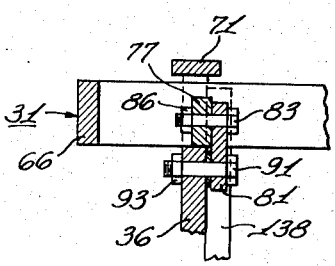
FIG. 7 is a view similar to FIG. 6 but showing an arm of the overhead guard at a different transverse spacing to accommodate a mast of greater transverse width.

Referring also to FIG. 6 a pair of longitudinal braces 77, 78 extend between and are welded to transverse bars 64, 65. The arms 36, 37 are releasably secured to the braces 77, 78 through a pair of vertical links 81, 82, which have their upper ends pivotally connected to the braces 77, 78 by fastening means in the form of bolts 83, 84 and nuts 86, 87. The lower ends of the links 81, 82 are releasably secured to the arms 36, 37 by bolts 91, 92 and nuts 93, 94. Referring to FIG. 7 the overhead guard 31 may be mounted on a mast having a different width, as represented in part by plate 138, by releasably securing the arm 36 to the left side of the vertical link 81 as viewed in FIG. 7. When the bolt 83 extends through transverse hole 96 in brace 77, as in FIG. 4, the grill 31 will be disposed at its longitudinally forward position relative to the arm 36. However, it may optionally be shifted to a longitudinally rearward position as shown in FIG. 5 by passing the bolt 83 through the transverse hole 97 in brace 77.

Referring again to FIG. 1, when the overhead guard 31 is swung to its upright position vertically above the mast 13, it encounters stops in the form of cooperating abutment surfaces 101, 102, 103, 104 formed on the arms 36, 37 and lugs 57, 58 which limit swinging movement of the guard and maintain it in its upright position.

As is apparent from the foregoing description, an overhead guard has been provided for a battery powered, narrow aisle straddle truck which pivotally mounts on the top of the lift truck mast and is swingable from a horizontal position to a vertical position so as to permit the battery to be lifted slightly by an overhead lift without interference with the guard, such as is shown in phantom by dot-dash lines 124. The battery is then shifted laterally from the truck by the overhead lift. It should be understood that the battery cover 26 is pivoted rearwardly when the battery is removed. The abutments 51, 52, 53, 54 are so arranged as to carry any substantial vertical loading on the arm 37 thereby preventing destructive loading of cap screw 44. The arms 36 and 37 of the overhead guard may be releasably secured to the grill 61 in different transverse spacing thereby providing optional mounting of the guard on lift trucks with different width masts. Also, the grill 61 is shiftable rearwardly from its position shown in FIG. 4 to that shown in FIG. 5 thereby providing operator station protection for a lift truck wherein the operator station is somewhat farther to the rear of the truck. The plates 71 and 72 keep the grill and arms in loose assembly and strengthen the arms.

The embodiments of the invention in which an exclusive property or privelege is claimed are defined as follows:

1. In an electric lift truck the combination comprising:
   a load carriage,
   a lift mast mounted on the front end of said truck and mounting said load carriage for reciprocal vertical movement relative thereto,
   an operator's station at the rear end of said truck,
   a top opening battery compartment intermediate said mast and said operator's station,
   an overhead guard for the operator's station including
   a guard grill, and
   a pair of longitudinally extending cantilever arms supporting said grill and having front ends disposed on the laterally outer sides of said mast,
   pivot means pivotally connecting said arms to the top of said mast on a transverse pivot axis for swinging movement from a normal horizontal position above said operator's station to an upright position above said mast in which position a battery may be lifted and removed from said battery compartment without interference with said guard, and
   cooperable abutments on said mast and arms, respectively, operable on abutment to prevent downward swinging movement of said arms below said horizontal position, said abutments permitting upward swinging movement of said arms and being disposed forwardly of said battery compartment and operator's station so as not to interfere with lifting and removal of said battery,
   whereby the mounting of said guard on said mast allows the uppermost portion of said carriage to be elevated above said pivot means without interference with said overhead guard or said pivot means.

2. The structure of claim 1 and further comprising fastening means releasably securing said arms to said grill, said arms, grill and fastening means being constructed so as to permit said arms to be connected to said grill at different transverse spacing so that the guard may be optionally mounted on different width masts.

3. The structure of claim 1 wherein each of said arms includes a transversely opening and longitudinally elongated window, said grill includes a transverse member extending through said windows and having a longitudinal dimension which is less than the longitudinal length of said windows, thereby permitting longitudinal adjustment of said grill relative to said arms and further comprising releasable fastening means releasably securing said grill in one of a plurality of positions of longitudinal adjustment relative to said arms.

4. The structure of claim 3 wherein said windows and transverse member are operable to maintain said grill and arms in assembly when said fastening means are released.

5. The structure of claim 1 wherein said mast includes a pair of laterally spaced uprights and said cooperable abutments include a pair of spaced abutments on each of said uprights engageable with confronting abutments on said arms.

6. The structure of claim 5 and further comprising cooperating stops on said overhead guard and mast operable to limit swinging movement of said overhead guard when the latter is pivoted to an upright position above said mast and to maintain said overhead guard in said upright position.

7. The structure of claim 5 wherein said pair of spaced abutments are on longitudinally opposite sides of said pivot means.

8. The structure of claim 7 wherein said spaced abutment at the front of said pivot means faces downwardly and said spaced abutment at the rear of said pivot means faces upwardly whereby said abutments carry substantially all of the vertical loading which may be imposed on said overhead guard by falling cargo or the like.

* * * * *